United States Patent
Kaneko (10) Patent No.: US 9,652,411 B2
(45) Date of Patent: May 16, 2017

(54) IMAGE FORMING APPARATUS THAT TRANSMITS AND RECEIVES INFORMATION BETWEEN PLATFORMS, RECORDING MEDIUM, AND METHOD

(71) Applicant: KYOCERA Document Solutions Inc., Osaka (JP)

(72) Inventor: Kotaro Kaneko, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/096,796

(22) Filed: Apr. 12, 2016

(65) Prior Publication Data

US 2016/0306755 A1 Oct. 20, 2016

(30) Foreign Application Priority Data

Apr. 17, 2015 (JP) .................. 2015-085090

(51) Int. Cl.
| | |
|---|---|
| *G06F 3/00* | (2006.01) |
| *G06F 13/12* | (2006.01) |
| *G06F 13/28* | (2006.01) |
| *G06F 13/00* | (2006.01) |
| *G06F 13/10* | (2006.01) |
| *G06F 3/06* | (2006.01) |

(52) U.S. Cl.
CPC .......... *G06F 13/102* (2013.01); *G06F 3/0613* (2013.01); *G06F 3/0659* (2013.01); *G06F 3/0683* (2013.01)

(58) Field of Classification Search
CPC ....... G06F 11/0733; G06F 15/00; G06F 15/76
USPC ...................... 710/74, 1, 7, 8, 100
See application file for complete search history.

(56) References Cited

U.S. PATENT DOCUMENTS

| | | | | |
|---|---|---|---|---|
| 5,835,957 A | * | 11/1998 | Lin ........................ | G06F 3/0601 710/1 |
| 7,426,588 B2 | * | 9/2008 | Hirako ................... | G06F 3/0613 709/216 |
| 7,624,241 B2 | * | 11/2009 | Eguchi .................... | G06F 3/061 707/999.002 |
| 2004/0239959 A1 | * | 12/2004 | Yada .................... | H04N 1/3875 358/1.2 |
| 2005/0044551 A1 | | 2/2005 | Sodhi ........................... | 719/312 |
| 2005/0146614 A1 | * | 7/2005 | Silverbrook ......... | B41J 2/14427 348/207.2 |

(Continued)

FOREIGN PATENT DOCUMENTS

JP 2005-135382 A 5/2005

*Primary Examiner* — Idriss N Alrobaye
*Assistant Examiner* — Getente A Yimer
(74) *Attorney, Agent, or Firm* — Stein IP, LLC (57) ABSTRACT

An image forming apparatus includes a storage device, main process circuitry, and sub-process circuitry. The main process circuitry writes main-side transmission information to the storage device by all transmission/reception methods usable by the main process circuitry itself. The sub-process circuitry executes a specific process using the main-side transmission information read from the storage device to write process result information that indicates an execution result of the specific process to the storage device by a sub-usable method. The main process circuitry reads the process result information that has been written to the storage device by the sub-process circuitry by the sub-usable method from the storage device by the sub-usable method.

8 Claims, 8 Drawing Sheets

(56) References Cited

U.S. PATENT DOCUMENTS

2006/0136488 A1\* 6/2006 Mifune .............. H04N 1/00204

\* cited by examiner

FIG. 8

IMAGE FORMING APPARATUS THAT TRANSMITS AND RECEIVES INFORMATION BETWEEN PLATFORMS, RECORDING MEDIUM, AND METHOD

INCORPORATION BY REFERENCE

This application is based upon, and claims the benefit of priority from, corresponding Japanese Patent Application No. 2015-085090 filed in the Japan Patent Office on Apr. 17, 2015, the entire contents of which are incorporated herein by reference.

BACKGROUND

Unless otherwise indicated herein, the description in this section is not prior art to the claims in this application and is not admitted to be prior art by inclusion in this section.

As a method of transmitting and receiving information between different platforms, there is provided a method that transmits and receives information between processes independent of the platforms.

SUMMARY

An image forming apparatus according to one aspect of the disclosure includes a storage device, main process circuitry, and sub-process circuitry. The sub-process circuitry is executed on a platform different from a platform on which the main process circuitry is executed. The sub-process circuitry is called from the main process circuitry. The main process circuitry writes main-side transmission information to the storage device, the main-side transmission information being transmitted from the main process circuitry to the sub-process circuitry, the main-side transmission information being written by all transmission/reception methods usable by the main process circuitry itself. The sub-process circuitry reads the main-side transmission information from the storage device by a sub-usable method, the main-side transmission information being written to the storage device by the main process circuitry by the sub-usable method as a transmission/reception method usable by the sub-process circuitry itself, the sub-process circuitry executing a specific process using the main-side transmission information read from the storage device, the sub-process circuitry writing process result information to the storage device by the sub-usable method, the process result information indicating an execution result of the specific process. The main process circuitry reads the process result information from the storage device by the sub-usable method, the process result information has been written to the storage device by the sub-process circuitry by the sub-usable method.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 5 illustrates a schematic diagram of an exemplary storage unit according to the one embodiment, where main-side transmission information is written by the program a;

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, the following describes a configuration of a Multifunction Peripheral (MFP) as an image forming apparatus according to the embodiment.

Figure 1:
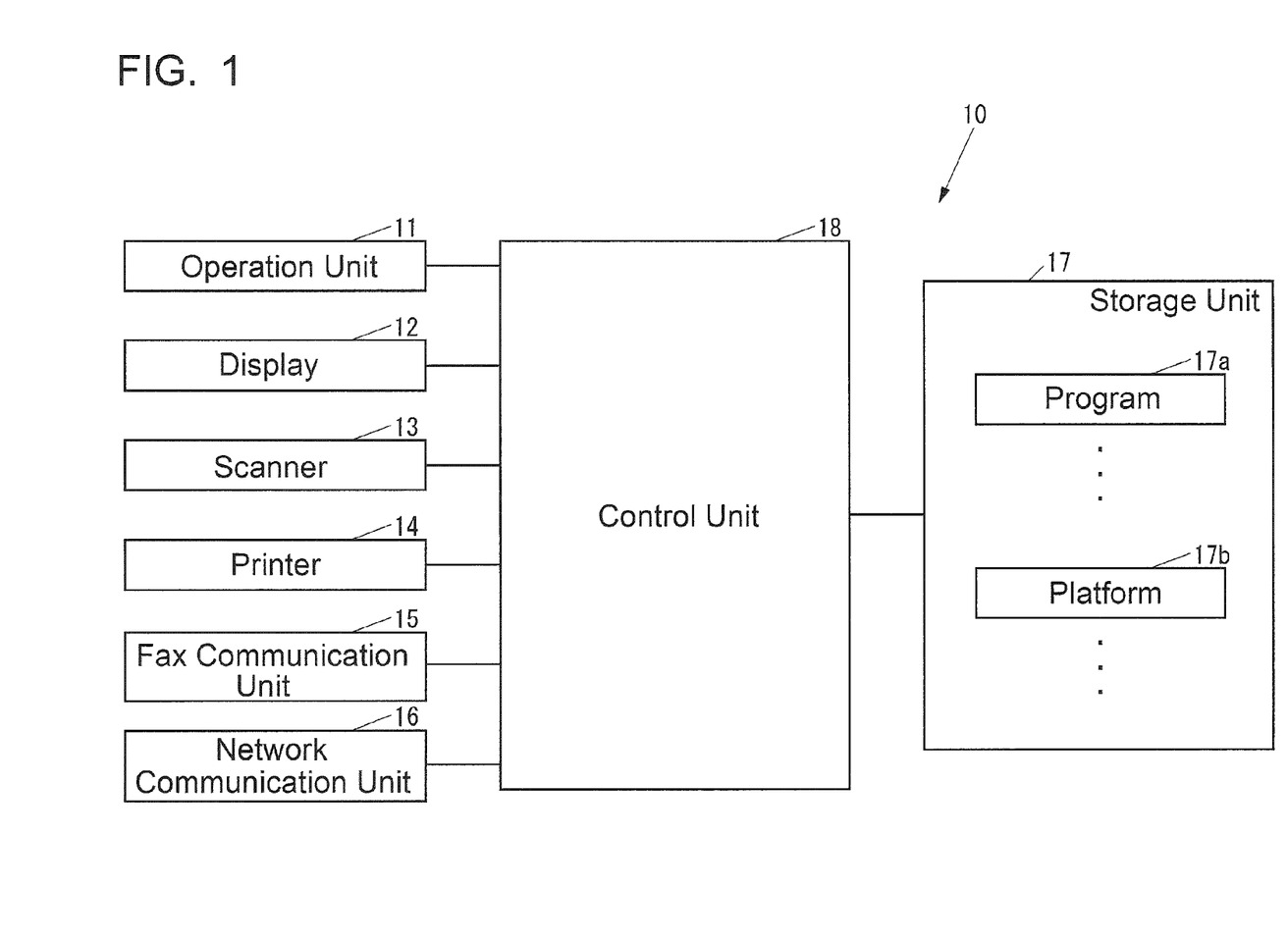
FIG. 1 illustrates a functional block configuration of an MFP according to one embodiment of the disclosure.

FIG. 1 illustrates an MFP 10 according to the embodiment.

As illustrated in FIG. 1, the MFP 10 includes an operation unit 11, a display 12, a scanner 13, a printer 14, a fax communication unit 15, a network communication unit 16, a storage unit 17, and a control unit 18. The operation unit 11 is an input device such as a button for receiving various kinds of operations. The display 12 is a display device such as a Liquid Crystal Display (LCD) that displays various kinds of information. The scanner 13 is a reading device that reads an image from an original document. The printer 14 is a print device that executes a print job on a recording medium such as a paper sheet. The fax communication unit 15 is a fax device that performs a fax communication with an external facsimile device (not illustrated) via a communication line such as a dial-up line. The network communication unit 16 is a network communication device that communicates with an external device via a network such as a Local Area Network (LAN) and the internet. The storage unit 17 is a non-volatile storage device such as an Electrically Erasable Programmable Read Only Memory (EEPROM (registered trademark)) and Hard Disk Drive (HDD) that stores various kinds of information. The control unit 18 controls the whole MFP 10.

The storage unit 17 can store a plurality of programs 17a. The storage unit 17 can also store a plurality of platforms 17b on which the programs 17a operate. The platforms 17b include operating systems such as Windows (registered trademark) and Linux (registered trademark), and virtual environments on operating systems such as, .NET Framework, Java (registered trademark), and Perl (registered trademark).

The control unit 18 includes, for example, a Central Processing Unit (CPU), a Read Only Memory (ROM), which stores programs and various kinds of data, and a Random Access Memory (RAM), which is used as a work area of the CPU. The CPU executes the program stored in the ROM or the storage unit 17.

The control unit 18 executes the programs 17a and the platforms 17b stored in the storage unit 17.

Next, operations of the MFP 10 will be described.

Figure 2:
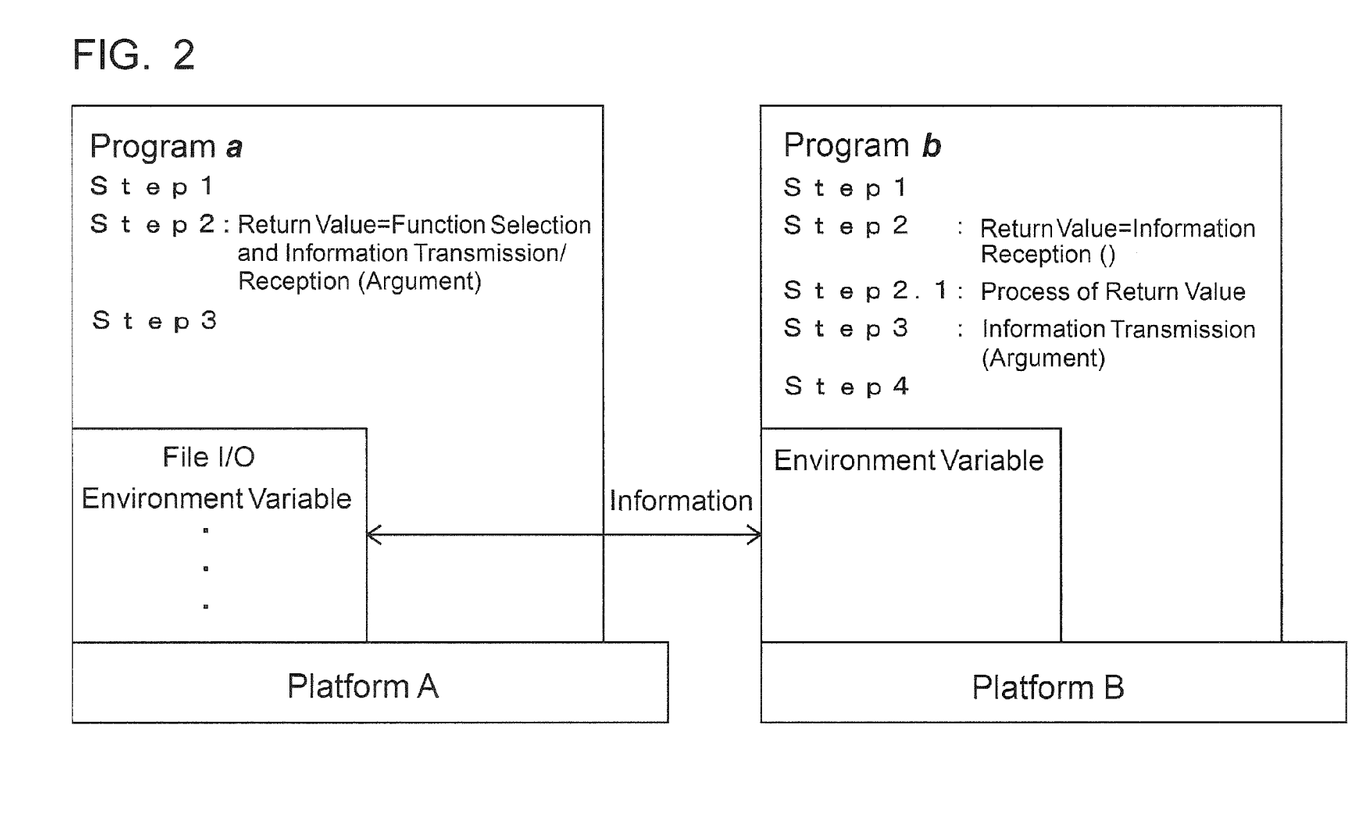
FIG. 2 illustrates a schematic diagram of an exemplary method of transmitting and receiving information between different platforms in the MFP according to the one embodiment.

FIG. 2 illustrates an exemplary method of transmitting and receiving information between different platforms in the MFP 10.

As illustrated in FIG. 2, a program a is a program executed on a platform A. For example, the platform A is a Java platform, and the program a is a Java program.

The program a is a program that executes Step 1, Step 2, and Step 3 illustrated in FIG. 2 in the order of FIG. 2.

The program a can transmit and receive information by all the transmission/reception methods usable by the platform A such as, file I/O and environment variable.

A program b is a program that is executed on a platform B, which is different from the platform A. For example, the platform B is a Perl platform, while the program b is a Perl program.

The program b is a program that executes Step 1, Step 2, Step 2.1, Step 3, and Step 4 illustrated in FIG. 2 in the order of FIG. 2. For example, the program b is a program that acquires a state of the MFP such as a state of printing with the printer 14.

The program b can transmit and receive information only by the environment variable that is set in advance among the transmission/reception methods usable by the platform B. For example, the environment variable is selected as the usable transmission/reception method for the program b when developing the program b.

The platform A and the platform B are virtual environments on an identical operating system.

The program b is a program that is called by the program a at the beginning of Step 2 of the program a, for example. That is, the program a constitutes a main process unit, and the program b constitutes a sub-process unit. (the main process unit is also referred to as main process circuitry and the sub-process unit is also referred to as sub-process circuitry).

First, the following describes a process of the program a in detail.

The program a executes a process at Step 2 after a process at Step 1. The program a executes "function selection" and "information transmission/reception (argument)" at Step 2.

"Function selection" at Step 2 of the program a is a process to select all the transmission/reception methods usable by the platform A.

Figure 3:
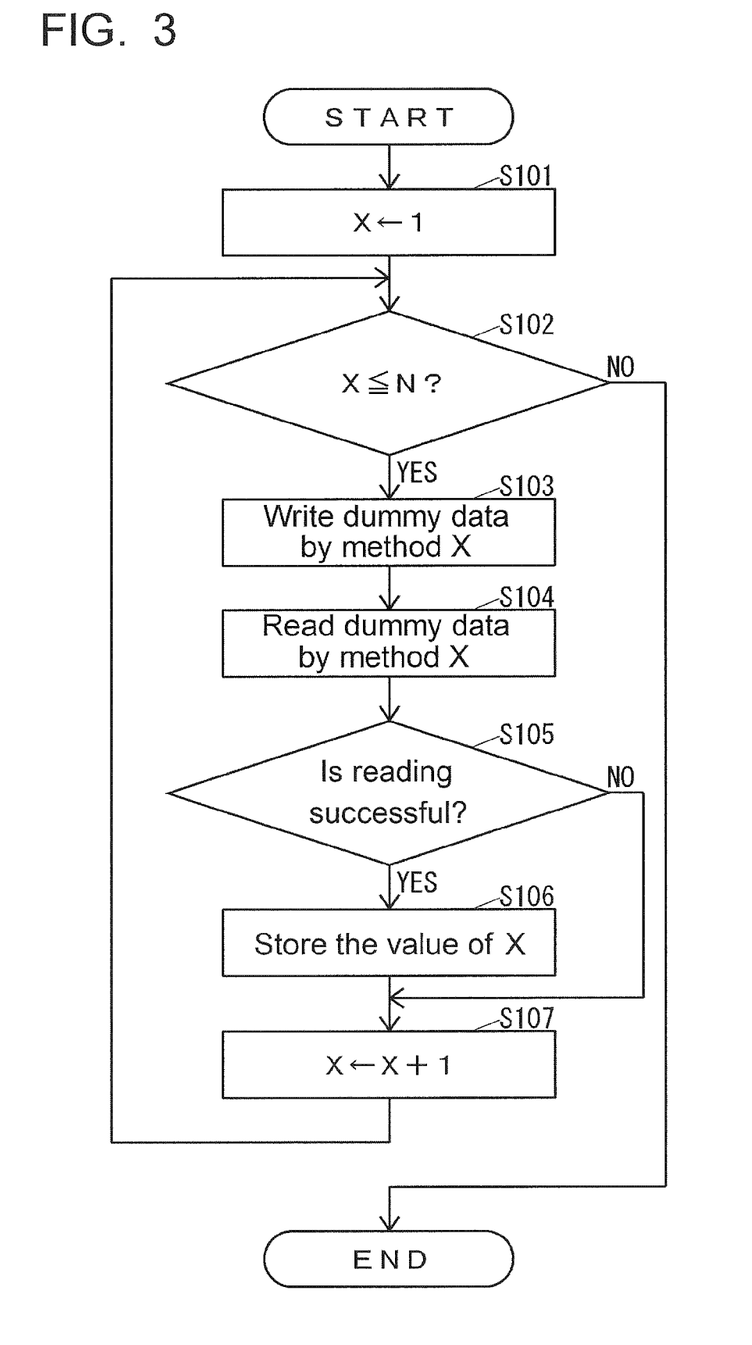
FIG. 3 illustrates a flowchart of "function selection" at Step 2 of a program a according to the one embodiment.

FIG. 3 illustrates "function selection" at Step 2 of the program a.

Here, the program a recognizes N transmission/reception methods that are prepared in advance. These transmission/reception methods are attached with numbers from 1 to N. For example, environment variable, file I/O, shared memory, socket . . . are attached with numbers such as method 1, method 2, method 3, method 4 . . . , respectively.

As illustrated in FIG. 3, the program a assigns the value of 1 to a variable X (S101) to determine whether or not X is equal to or less than N (S102).

After the program a determines that X is equal to or less than N at S102, the program a writes dummy data as specific information to a specific region in the storage unit 17 by a method X (S103), and reads the dummy data written to the specific region at S103 from the storage unit 17 by the method X (S104).

Next, the program a determines whether or not reading of the dummy data from the storage unit 17 at S104 is successful (S105). Here, if the dummy data written at S103 is identical to the data read at S104, the program a determines that reading of the dummy data from the storage unit 17 at S104 is successful.

If the program a determines that reading of the dummy data from the storage unit 17 is successful at S105, the program a stores the value of the current X (S106).

If the program a determines that reading of the dummy data from the storage unit 17 is failed at S105, or the process at S106 is terminated, the program a increases the value of the variable X by one (S107), and executes the process at S102.

If the program a determines that X exceeds N at S102, the program a terminates the process illustrated in FIG. 3.

As described above, the program a selects the transmission/reception methods that successfully read the dummy data from the storage unit 17 (YES at S105) as the transmission/reception methods usable by the program a itself (S106).

Figure 4:
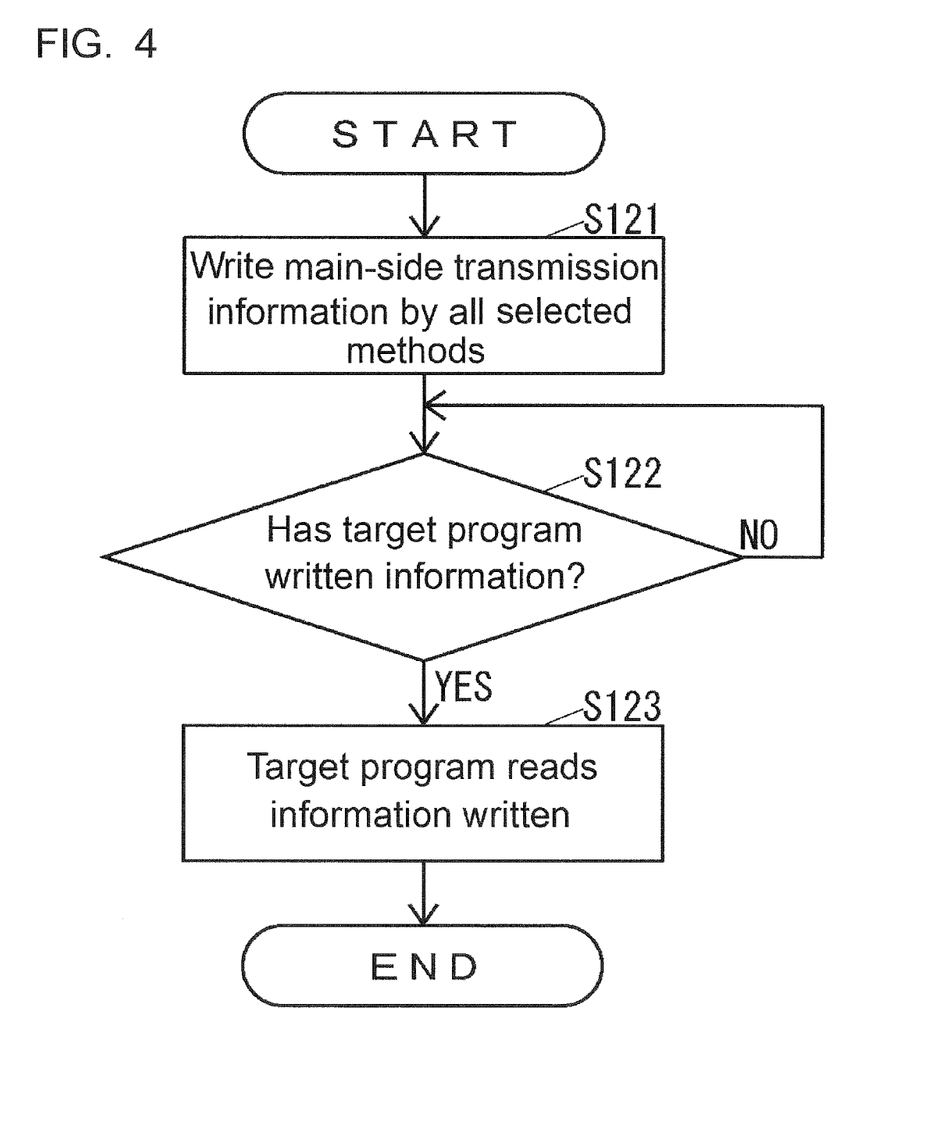
FIG. 4 illustrates a flowchart of "information transmission/reception (argument)" at Step 2 of the program a according to the one embodiment.

FIG. 4 illustrates "information transmission/reception (argument)" at Step 2 of the program a.

As illustrated in FIG. 4, the program a writes main-side transmission information as argument to the region for the program a in the storage unit 17 by all the methods selected as the transmission/reception methods usable by the program a itself in the process illustrated in FIG. 3 (S121). For example, the main-side transmission information is the IP address of the MFP the state of which is a target to be acquired by the program b. Since the program a writes the main-side transmission information as the argument, the program a converts a data format of the main-side transmission information from a binary format, which is difficult to handle, to a text format, which is easy to handle, by encoding the main-side transmission information by a method such as Base64.

Figure 5:
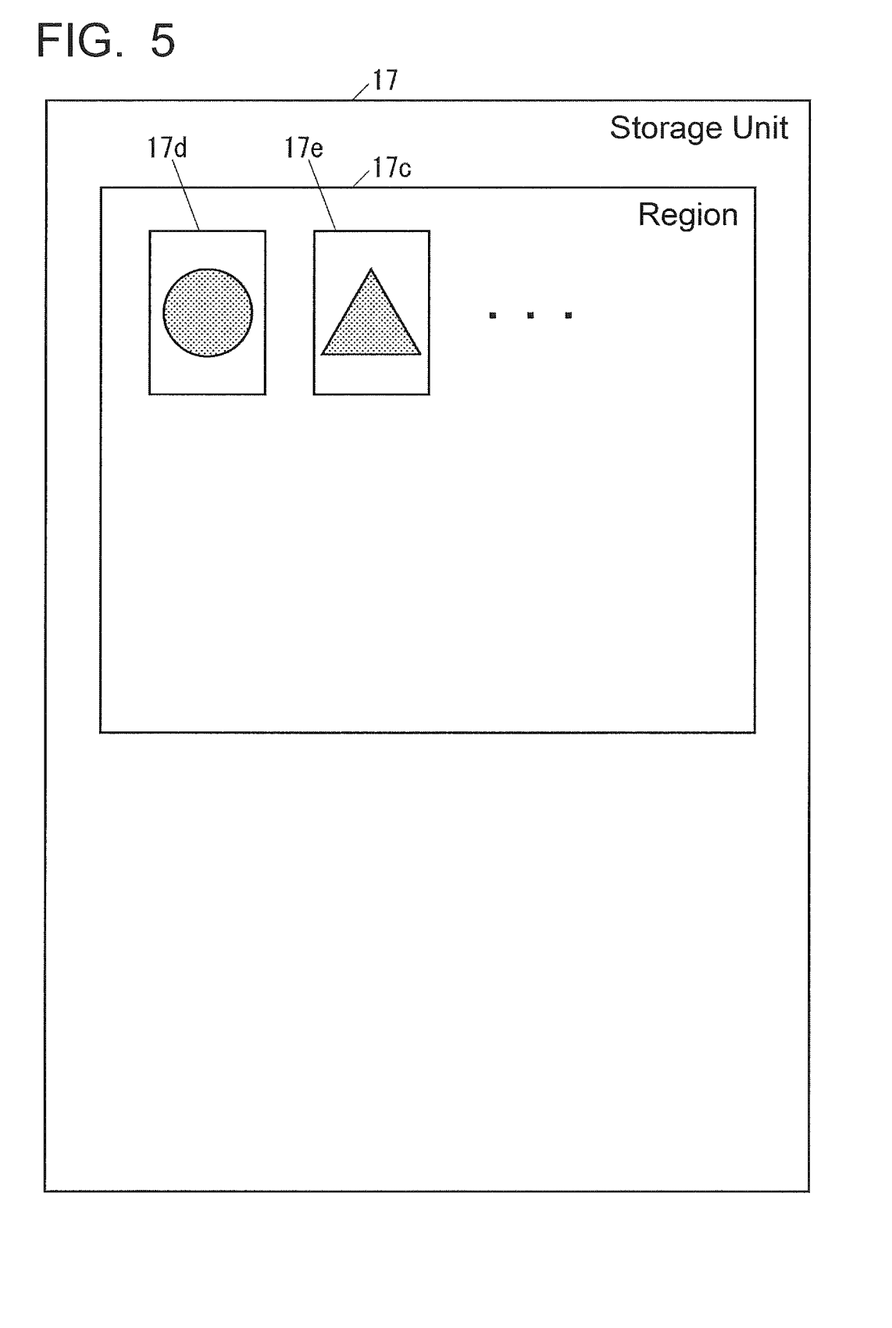

FIG. 5 illustrates an exemplary storage unit 17 that has the main-side transmission information written by the program a.

As illustrated in FIG. 5, a region 17c that is the region for the program a in the storage unit 17 includes the main-side transmission information that is written by all the methods selected as the transmission/reception methods usable by the program a in the process illustrated in FIG. 3. The main-side transmission information includes main-side transmission information 17d that is written by file I/O, and main-side transmission information 17e that is written by environment variable, for example.

As illustrated in FIG. 4, after the process at S121, the program a determines whether or not the target program or the program b writes the information until the program a determines that the program b writes the information (S122). Here, the program a determines that the program b writes the information when the value of the region that has the program ID identifying the program b written in the storage unit 17 varies. Since the program a is the program that called the program b, the program a recognizes the program ID of the program b.

Figure 6:
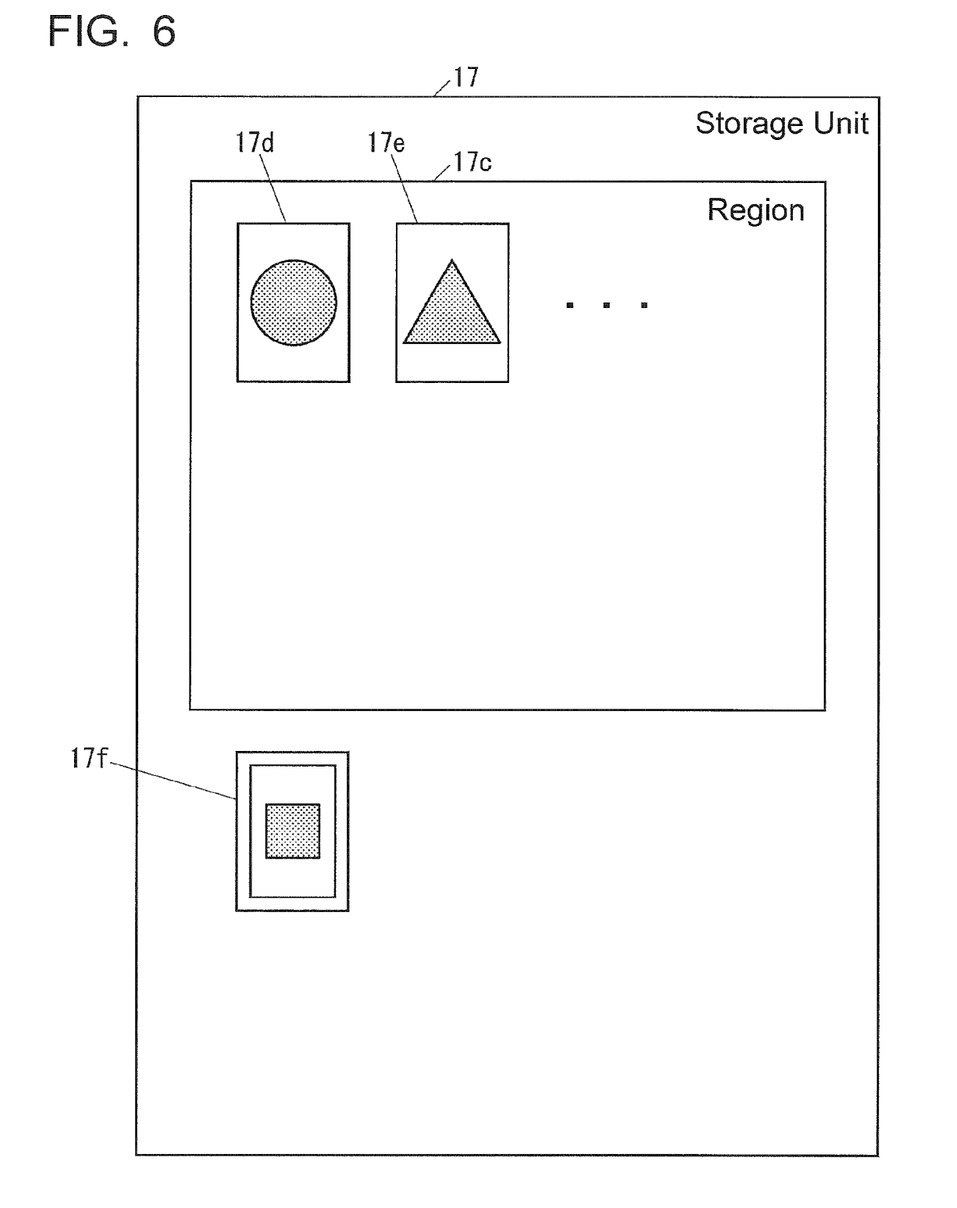
FIG. 6 illustrates a schematic diagram of an exemplary storage unit according to the one embodiment, where process result information that indicates a result of a specific process executed by a program b is written by the program b.

FIG. 6 illustrates an exemplary storage unit 17 where process result information, which indicates a result of a specific process executed by the program b, is written by the program b.

As illustrated in FIG. 6, a region 17f that is the region for the program b in the storage unit 17 includes the process result information written by the environment variable. The region 17f includes the program ID of the program b and a separator configured by codes other than ASCII codes as well as the process result information. The process result information is in a text format as described below. Accordingly, the separator can separate the program ID of the program b and the process result information to distinguish them and if there are a plurality of pieces of the process result information, the separator can separate the plurality of pieces of the process result information from one another to distinguish them.

As illustrated in FIG. 4, when the program a determines that the program b writes the information at S122, the program a reads the information written by the program b as a return value of Step 2 of the program a (S123), and terminates the operations illustrated in FIG. 4.

As illustrated in FIG. 2, the program a executes the process at Step 3 after the process at Step 2.

Next, the following describes a process of the program b in detail.

As illustrated in FIG. 2, the program b executes processes at Step 2, Step 2.1, and Step 3 after the process at Step 1.

Figure 7:
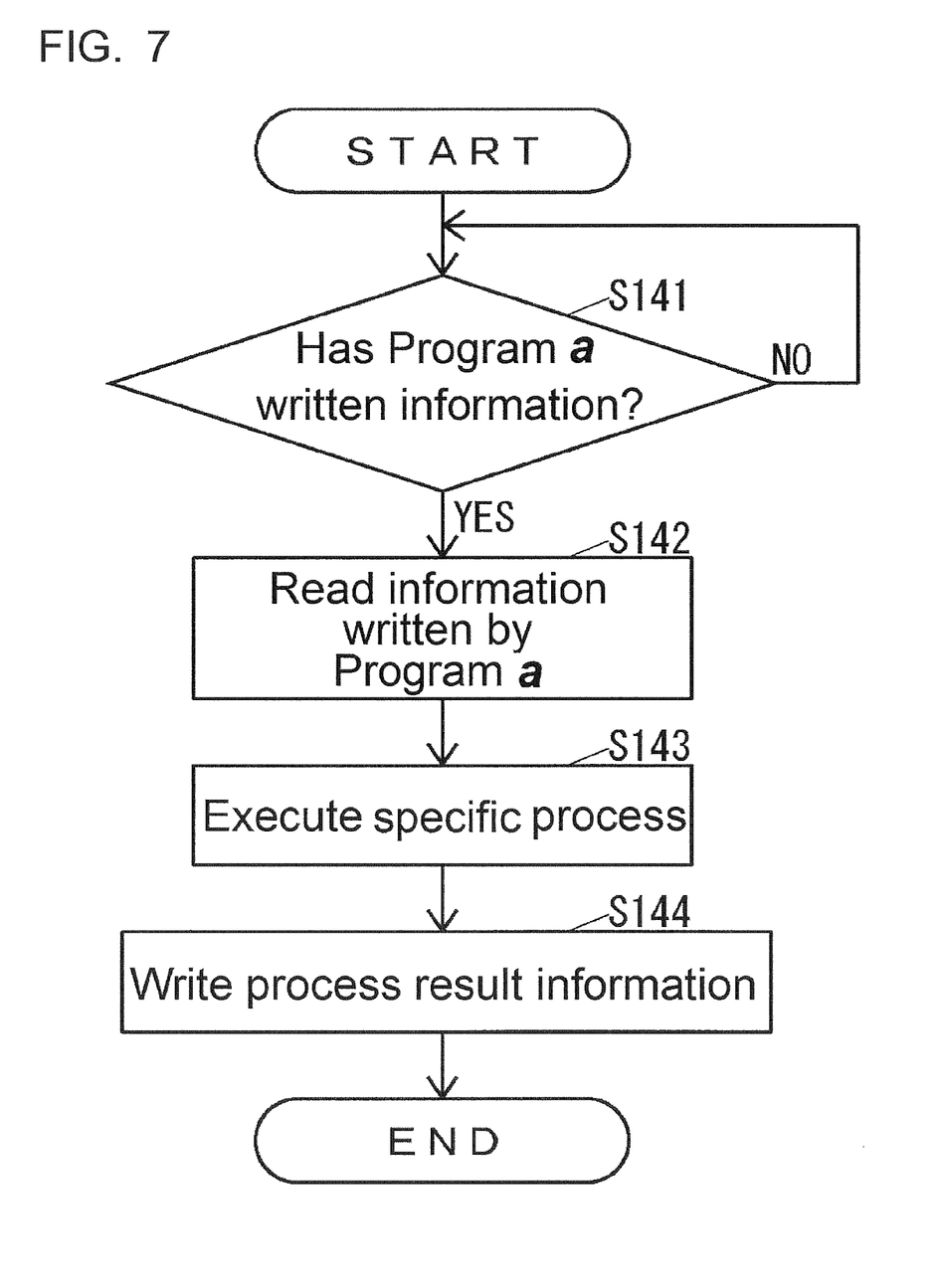
FIG. 7 illustrates a flowchart of operations of the program b according to the one embodiment when receiving and transmitting information.

FIG. 7 illustrates operations of the program b when receiving and transmitting information.

As illustrated in FIG. 7, the program b determines whether or not the program a writes information to the region 17c that is the region for the program a in the storage unit 17 until the program b determines that the program a writes the information by the environment variable to the region 17c (S141). Here, the program b determines that the program a writes the information to the region 17c that is the region for the program a in the storage unit 17 when the value written by the environment variable to the region 17c varies.

The program b reads the information written by the program a as the return value of Step 2 of the program b by environment variable when the program b determines that the program a writes the information to the region 17c at S141 (S142, Step 2).

Next, the program b executes a specific process using the information read at S142 (S143, Step 2.1).

Next, the program b writes the process result information that indicates a result of the specific process executed at S143 as argument to the region for the program b in the storage unit 17 by environment variable (S144, Step 3). Since the program b writes the process result information as argument, the program b converts a data format of the process result information from a binary format, which is difficult to handle, to a text format, which is easy to handle, by encoding the process result information by a method such as Base64. Here, if there are a plurality of pieces of the process result information, the program b writes the plurality of pieces of the process result information by environment variable to the region for the program b in the storage unit 17.

As illustrated in FIG. 2, the program b executes the process at Step 4 after the process at Step 3.

To summarize the operations of the program a and the program b described above, the MFP 10 operates as follows.

Figure 8:
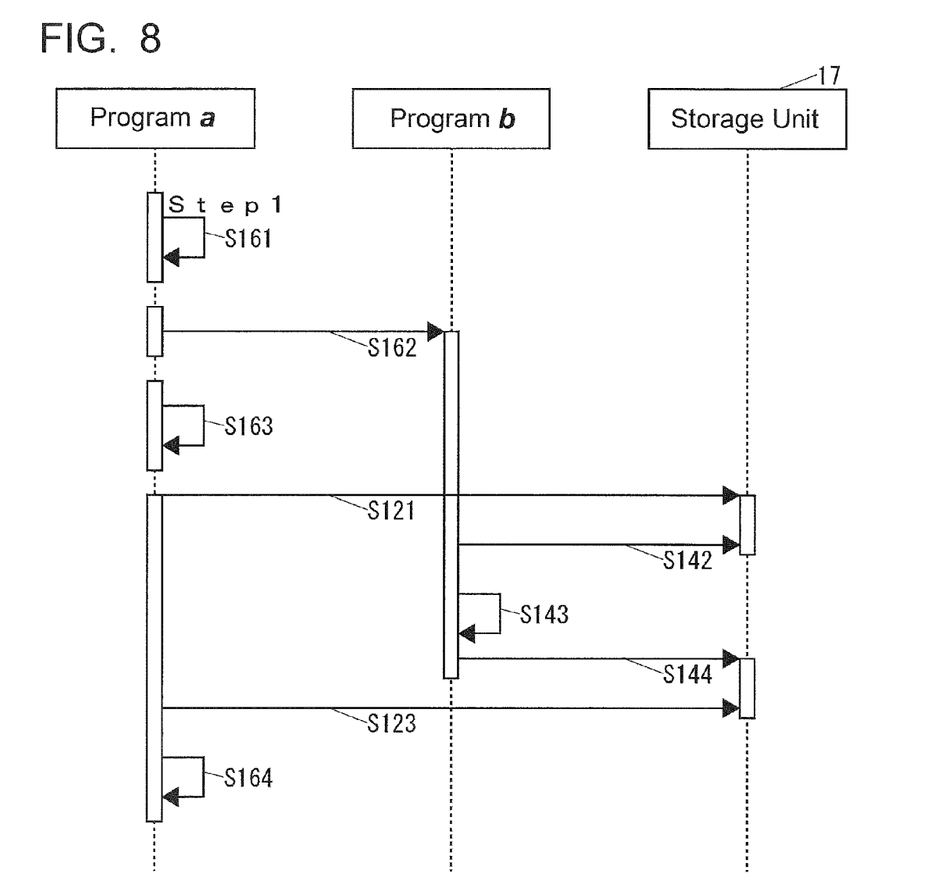
FIG. 8 illustrates a sequence diagram of operations of the MFP according to the one embodiment.

FIG. 8 illustrates the operations of the MFP 10.

As illustrated in FIG. 8, the program a executes Step 1 of the program a (S161) to call the program b (S162). Accordingly, the program b starts the operations illustrated in FIG. 7.

The program a executes the operations illustrated in FIG. 3 after the process at S162 (S163). Although FIG. 8 illustrates as if the program a and the storage unit 17 do not communicate in the process at S163, in practice, as described above, the program a and the storage unit 17 communicate.

The program a starts the operations illustrated in FIG. 4 after the process at S163. Specifically, the program a writes the main-side transmission information as argument to the region for the program a in the storage unit 17 by all the methods selected as the transmission/reception methods usable by the program a itself in the process at S163 (S121). For example, the main-side transmission information is the IP address of the MFP the state of which is a target to be acquired by the program b.

Next, the program b reads the main-side transmission information that the program a writes to the storage unit 17 by a sub-usable method as the transmission/reception method usable by the program b itself, namely, environment variable, from the storage unit 17 by environment variable (S142). For example, the program b reads the IP address of the target MFP.

The program b executes the specific process using the main-side transmission information read at S142 (S143). For example, the program b reads the state from the target MFP based on the IP address as the main-side transmission information.

Next, the program b writes the process result information, which indicates a result of the process executed at S143, by environment variable to the storage unit 17 (S144). For example, the program b writes the state of the target MFP to the storage unit 17.

Next, the program a reads the process result information that the program b writes to the storage unit 17 by environment variable, from the storage unit 17 by environment variable (S123). For example, the program a reads the state of the target MFP.

Next, the program a processes the process result information read at S123 (Step 3, S164). For example, the program a displays the state of the target MFP on the display 12.

The MFP 10 can improve the probability of the successful transmission and reception of information between different platforms by: the program a's writing the main-side transmission information that is transmitted from the program a to the program b by all the transmission/reception methods usable by the program a to the storage unit 17 (S121); the program b's reading the main-side transmission information that is written to the storage unit 17 by environment variable that is the usable transmission/reception method by the program b among all the transmission/reception methods usable by the program a, from the storage unit 17 by environment variable (S142); the program b's executing the process using the main-side transmission information read from the storage unit 17 (S143); the program b's writing the process result information that indicates the result of the process executed by the program b to the storage unit 17 by environment variable (S144); and the program a's reading the process result information from the storage unit 17 by environment variable (S123), as described above. That is, the MFP 10 can transmit and receive information between programs with different platforms by the general-purpose method.

The MFP 10 actually writes (S103) and reads (S104) specific information by various transmission/reception methods to and from the storage unit 17 so as to confirm the transmission/reception methods usable by the program a (S106). This eliminates the need for the MFP 10 to store the transmission/reception methods usable by the program a in advance.

Since the MFP 10 includes the program ID that is as the identification information of the program b itself in the process result information (S144), the program a can determine which program b process result information it is. Accordingly, the MFP 10 can have a plurality of program b's for the program a.

Similarly, the MFP 10 may include the program ID that is as the identification information of the program a itself in the main-side transmission information if the MFP 10 may have a plurality of program a's for the program b.

The sub-usable method of the disclosure is described as the environment variable in the embodiment. However, the sub-usable methods may be transmission/reception methods other than the environment variable.

The relation between two programs operating on the different virtual environments on the identical operating system is described above. The same applies to the relation between two programs operating on the different operating systems. The situations where the transmission/reception methods differ, such as the environment variable does not exist and a socket is unusable, can occur remarkably when the operating systems on which two programs operate differ.

The image forming apparatus of the disclosure is the MFP in the embodiment, however, it may be an image forming apparatus other than MFP, such as a printer-only machine, a copy-only machine, and a scanner-only machine.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

FIG. 1
Operation Unit
Storage Unit
Display
Program
Scanner
Control Unit
Platform
Printer
Fax Communication Unit
Network Communication Unit
FIG. 2
Program a
Program b
Return Value=Function Selection and Information Transmission/Reception (Argument)
Return Value=Information Reception 0
Process of Return Value
Information Transmission (Argument)
File I/O
Environment Variable
Environment Variable
Information
Platform A
Platform B
FIG. 3
Write dummy data by method X
Read dummy data by method X
Is reading successful?
Store the value of X
FIG. 4
Write main-side transmission information by all selected methods
Has target program written information?
Target program reads information written
FIG. 5
Storage Unit
Region
FIG. 6
Storage Unit
Region
FIG. 7
Has program a written information?
Read information written by program a
Execute specific process
Write process result information
FIG. 8
Program a
Program b
Storage Unit

What is claimed is:

1. An image forming apparatus, comprising:
a Central Processing Unit (CPU); and
a storage device, the storage device including:
  a first program executed on a first platform; and a second program executed on a second platform that is different from the first platform,
wherein the CPU functions as a main process circuitry by executing the first program, and functions as a sub-process circuitry by executing the second program,
wherein the main process circuitry i) transmits and receives information by all transmission/reception methods usable by the first platform, and ii) selects the transmission/reception methods that successfully read dummy data from the storage device as the transmission/reception methods usable by the main process circuitry,
wherein the sub-process circuitry i) is called from the main process circuitry, and ii) transmits and receives the information by an environment variable that is set in advance among the transmission/reception methods usable by the second platform,
wherein the main process circuitry i) writes main-side transmission information as an argument to a region for the first program in the storage device by all the transmission/reception methods selected as the transmission/reception methods usable by the main process circuitry itself, and ii) converts a data format of the main-side transmission information as the argument from a binary format to a text format by encoding the main-side transmission information,
wherein the sub-process circuitry i) reads the main-side transmission information from the storage device by a sub-usable method as the transmission/reception method usable by the sub-process circuitry itself, the sub-usable method including the environment variable, ii) executes a specific process using the main-side transmission information read from the storage device, iii) writes process result information of the specific process as the argument to the region for the second program in the storage device by the sub-usable method including the environment variable, and iv) converts a data format of the process result information as the argument from the binary format to the text format by encoding the process result information, and wherein the main process circuitry reads the process result information written by the sub-process circuitry from the storage device by the sub-usable method including the environment variable.

2. The image forming apparatus according to claim 1,
wherein the sub-process circuitry includes identification information of the sub-process circuitry itself in the process result information.

3. A non-transitory computer-readable recording medium storing a first program executed on a first platform and a second program executed on a second platform that is different from the first platform, to control an image forming apparatus, the first program and the second program causing a Central Processing Unit (CPU) of the image forming apparatus to function as a main process circuitry and a sub-process circuitry, wherein the main process circuitry i) transmits and receives information by all transmission/reception methods usable by the first platform, and ii) selects the transmission/reception methods that successfully read dummy data from the storage device as the transmission/reception methods usable by the main process circuitry, wherein the sub-process circuitry i) is called from the main process circuitry, and ii) transmits and receives the information by an environment variable that is set in advance among the transmission/reception methods usable by the second platform, wherein the main process circuitry i) writes main-side transmission information as an argument to a region for the first program in the storage device by all the transmission/reception methods selected as the transmission/reception methods usable by the main process circuitry itself, and ii) converts a data format of the main-side transmission information as the argument from a binary format to a text format by encoding the main-side transmission information, wherein the sub-process circuitry i) reads the main-side transmission information from the storage device by a sub-usable method as the transmission/reception method usable by the sub-process circuitry itself, the sub-usable method including the environment variable, ii) executes a specific process using the main-side transmission information read from the storage device, iii) writes process result information of the specific process as the argument to the region for the second program in the storage device by the sub-usable method including the environment variable, and iv) converts a data format of the process result information as the argument from the binary format to the text format by encoding the process result information, and wherein the main process circuitry reads the process result information written by the sub-process circuitry from the storage device by the sub-usable method including the environment variable.

4. The recording medium according to claim 3,
wherein the sub-process circuitry includes identification information of the sub-process circuitry itself in the process result information.

5. A method with an image forming apparatus that includes a Central Processing Unit (CPU) and a storage device, wherein the storage device includes a first program executed on a first platform and a second program executed on a second platform that is different from the first platform, and the CPU functions as a main process circuitry by executing the first program, and functions as a sub-process circuitry by executing the second program, the method comprising:

via the main process circuitry,
  transmitting and receiving information by all transmission/reception methods usable by the first platform, and
  selecting the transmission/reception methods that successfully read dummy data from the storage device as the transmission/reception methods usable by the main process circuitry, via the sub-process circuitry,
  being called from the main process circuitry, and
  transmitting and receiving the information by an environment variable that is set in advance among the transmission/reception methods usable by the second platform, via the main process circuitry,
  writing main-side transmission information as an argument to a region for the first program in the storage device by all the transmission/reception methods selected as the transmission/reception methods usable by the main process circuitry itself, and
  converting a data format of the main-side transmission information as the argument from a binary format to a text format by encoding the main-side transmission information, via the sub-process circuitry,
  reading the main-side transmission information from the storage device by a sub-usable method as the transmission/reception method usable by the sub-process circuitry itself, the sub-usable method including the environment variable,
  executing a specific process using the main-side transmission information read from the storage device,
  writing process result information of the specific process as the argument to the region for the second program in the storage device by the sub-usable method including the environment variable, and
  converting a data format of the process result information as the argument from the binary format to the text format by encoding the process result information, and via the main process circuitry,
  reading the process result information written by the sub-process circuitry from the storage device by the sub-usable method including the environment variable.

6. The method according to claim 5, further comprising:
via the sub-process circuitry,
  including identification information of the sub-process circuitry itself into the process result information.

7. The image forming apparatus according to claim 1,
wherein the first platform includes a Java platform, and the first program includes a Java program, and
wherein the second platform includes a Perl platform, and the second program includes a Perl program.

8. The image forming apparatus according to claim 1,
wherein the second program includes a program that acquires a state of the image forming apparatus, and
wherein the main-side transmission information includes an IP address of the image forming apparatus, the state of which being a target to be acquired by the second program.

* * * * *